United States Patent
Ohno et al.

(10) Patent No.: US 11,155,231 B2
(45) Date of Patent: Oct. 26, 2021

(54) CURTAIN AIRBAG DEVICE FOR VEHICLE

(71) Applicant: TOYOTA JIDOSHA KABUSHIKI KAISHA, Toyota (JP)

(72) Inventors: Mitsuyoshi Ohno, Miyoshi (JP); Masaaki Okuhara, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 16/552,053

(22) Filed: Aug. 27, 2019

(65) Prior Publication Data

US 2020/0108792 A1 Apr. 9, 2020

(30) Foreign Application Priority Data

Oct. 3, 2018 (JP) .............................. JP2018-188247

(51) Int. Cl.
*B60R 21/232* (2011.01)
*B60R 21/235* (2006.01)
*B60R 21/2338* (2011.01)

(52) U.S. Cl.
CPC .......... *B60R 21/232* (2013.01); *B60R 21/235* (2013.01); *B60R 2021/23386* (2013.01); *B60R 2021/23514* (2013.01); *B60R 2021/23576* (2013.01)

(58) Field of Classification Search
CPC ... B60R 21/213; B60R 21/232; B60R 21/235; B60R 2021/23316; B60R 2021/23386; B60R 2021/23509; B60R 2021/23514; B60R 2021/23576
See application file for complete search history.

(56) References Cited

U.S. PATENT DOCUMENTS

| | | | | |
|---|---|---|---|---|
| 5,588,672 A | * | 12/1996 | Karlow | B60R 21/08 280/730.1 |
| 5,865,462 A | * | 2/1999 | Robins | B60R 21/232 280/730.2 |
| 6,152,481 A | * | 11/2000 | Webber | B60R 21/2338 280/730.2 |
| 6,176,515 B1 | * | 1/2001 | Wallner | B60R 21/232 280/729 |
| 6,394,487 B1 | * | 5/2002 | Heudorfer | B60R 21/232 280/729 |
| 6,419,268 B1 | * | 7/2002 | Webert | B60R 21/232 280/730.2 |
| 6,435,543 B1 | * | 8/2002 | Magoteaux | B60R 21/232 280/730.2 |

(Continued)

FOREIGN PATENT DOCUMENTS

JP 11240407 A * 9/1999 ....... B60R 21/23184
JP 2012-201312 A 10/2012
(Continued)

*Primary Examiner* — Laura Freedman
(74) *Attorney, Agent, or Firm* — Oliff PLC

(57) ABSTRACT

A restraint performance improvement portion of a curtain airbag device for a vehicle is provided at a location of a lower end portion of a curtain airbag which location corresponds with a vehicle seat when the vehicle seat is in a comfortable state. The restraint performance improvement portion inhibits a head area of a vehicle occupant from slipping past the curtain airbag to a vehicle width direction outer side thereof when the vehicle occupant is being restrained.

6 Claims, 8 Drawing Sheets

(56) References Cited

U.S. PATENT DOCUMENTS

| | | | | |
|---|---|---|---|---|
| 6,454,298 B1 * | 9/2002 | Hardig | ............ | B60R 21/232 280/729 |
| 6,648,368 B2 * | 11/2003 | Smith | ............ | B60R 21/23184 280/729 |
| 6,695,341 B2 * | 2/2004 | Winarto | ............ | B60R 21/08 280/730.2 |
| 7,077,425 B2 * | 7/2006 | Ogawa | ............ | B60R 21/213 280/730.2 |
| 7,159,895 B2 * | 1/2007 | Aoki | ............ | B60R 21/232 280/729 |
| 7,837,223 B2 * | 11/2010 | Shilliday | ............ | B60R 21/23184 280/730.2 |
| 7,988,187 B2 * | 8/2011 | Yamamura | ............ | B60R 21/232 280/730.2 |
| 8,025,308 B2 * | 9/2011 | Fletcher | ............ | B60R 21/232 280/730.2 |
| 8,353,530 B2 * | 1/2013 | Czach | ............ | B60R 21/2334 280/730.2 |
| 8,382,151 B2 * | 2/2013 | Kalandek | ............ | B60R 21/232 280/730.2 |
| 8,474,866 B1 * | 7/2013 | Arellano | ............ | B60R 21/232 280/730.2 |
| 8,789,845 B2 * | 7/2014 | Kato | ............ | B60R 21/2346 280/730.2 |
| 10,000,178 B2 * | 6/2018 | Fukawatase | ............ | B60R 21/233 |
| 10,144,385 B2 * | 12/2018 | Hernandez | ............ | B60R 21/23138 |
| 10,293,776 B2 * | 5/2019 | Ohno | ............ | B60R 21/235 |
| 10,773,680 B2 * | 9/2020 | Hioda | ............ | B60R 21/2334 |
| 2005/0189743 A1 * | 9/2005 | Bakhsh | ............ | B60R 21/232 280/730.2 |
| 2009/0218798 A1 * | 9/2009 | Garner | ............ | B60R 21/232 280/742 |
| 2012/0248751 A1 | 10/2012 | Kato et al. | | |
| 2015/0336531 A1 | 11/2015 | Kawamura et al. | | |
| 2020/0108791 A1 * | 4/2020 | Ohno | ............ | B60R 21/213 |

FOREIGN PATENT DOCUMENTS

| | | | |
|---|---|---|---|
| JP | 2012245897 A | * | 12/2012 |
| JP | 2012254712 A | * | 12/2012 |
| JP | 2016-055824 A | | 4/2016 |
| JP | 2016-088267 A | | 5/2016 |
| JP | 2017100682 A | * | 6/2017 |
| JP | 2018-052239 A | | 4/2018 |
| WO | 2014/132513 A1 | | 9/2014 |

* cited by examiner

CURTAIN AIRBAG DEVICE FOR VEHICLE

CROSS-REFERENCE TO RELATED APPLICATION

This application is based on and claims priority under 35 U.S.C. 119 from Japanese Patent Application No. 2018-188247 filed on Oct. 3, 2018, the disclosure of which is incorporated by reference herein.

BACKGROUND

Technical Field

The present disclosure relates to a curtain airbag device for a vehicle.

Related Art

JP-A No. 2016-088267 discloses an invention relating to a curtain airbag device for a vehicle. This curtain airbag device for a vehicle includes: a main chamber provided at a location corresponding with a vehicle seat; a sub chamber provided at the vehicle front side of the main chamber with a non-inflating portion therebetween; and a tension member of which one end portion is attached to an upper end portion of the main chamber and another end portion is attached to a lower end portion of the sub chamber. During an oblique collision of the vehicle, the head area of a vehicle occupant moves toward the vehicle front side while pushing the main chamber toward the vehicle width direction outer side. In consequence, the sub chamber is displaced to the vehicle width direction inner side by the tension member so as to wrap around the head area of the vehicle occupant and envelops the head area. Thus, restraint performance for the head area of the vehicle occupant may be improved.

SUMMARY

During autonomous driving of a self-driving vehicle that conducts driving autonomously, because a driver is released from driving, the driver is likely to adopt any of various postures. At this time, if a vehicle occupant adopts a comfortable posture in which a seat back of a vehicle seat is greatly reclined by more than a predetermined angle, the head area of the vehicle occupant is disposed further to the vehicle lower side in a vehicle side view than in a state during driving. (Below, a state in which the vehicle occupant is in a comfortable posture and the head area is disposed at the vehicle lower side in the vehicle side view relative to a state during driving is referred to as "the comfortable state".) If the curtain airbag inflates and deploys in the comfortable state, because the head area of the vehicle occupant is disposed in a vicinity of a lower end portion of the curtain airbag, it may not be possible to effectively restrain the head area.

To address this issue, extending the lower end portion of the curtain airbag at a time of inflation and deployment further to the vehicle lower side can be considered. However, in states other than the comfortable state, the extended lower end portion of the curtain airbag may interfere with a side airbag that inflates and deploys at the side of the vehicle occupant sitting on the vehicle seat from the vehicle width direction outer side of the seat back of the vehicle seat. In this situation, the curtain airbag may be lifted toward the vehicle upper side by the side airbag, which may alter the position of the curtain airbag relative to the vehicle occupant from a pre-specified position and affect vehicle occupant restraint performance. Thus, there is scope for improvement of the related art described above in regard to this problem.

In consideration of the circumstances described above, an object of the present invention is to provide a curtain airbag device for a vehicle that may assure restraint performance even when the head area of a vehicle occupant is disposed in a vicinity of a lower end portion of a curtain airbag at a time of inflation and deployment.

Solution to Problem

A curtain airbag device for a vehicle according to a first aspect of the present invention includes: a curtain airbag that, when an inflator activates at a time of vehicle collision and supplies gas into the curtain airbag, is configured to inflate and deploy toward a vehicle lower side from a vehicle width direction outer side end portion of a ceiling, and includes a leading end chamber provided at a vehicle front side of the curtain airbag, a lower end portion of the leading end chamber being disposed at the vehicle lower side relative to a belt line at a time of inflation and deployment; and a restraint performance improvement portion provided at a portion of a lower end portion of the curtain airbag that, in a comfortable state in which a seat back of a vehicle seat is tilted toward a vehicle rear side by at least a predetermined angle in a vehicle side view, corresponds to the vehicle seat in the comfortable state, the curtain airbag producing a reaction force at a time of inflation and deployment from a region at which the leading end chamber is disposed at the vehicle lower side relative to the belt line, and the restraint performance improvement portion inhibiting the head area of a vehicle occupant from slipping past the curtain airbag toward a vehicle width direction outer side thereof during restraint of the vehicle occupant.

The curtain airbag device for a vehicle according to the first aspect includes the curtain airbag and the restraint performance improvement portion. When the inflator activates at a time of vehicle collision and supplies gas into the curtain airbag, the curtain airbag inflates and deploys toward the vehicle lower side from the vehicle width direction outer side end portion of the ceiling. The leading end chamber is provided at the vehicle front side of the curtain airbag. The lower end portion of the leading end chamber is disposed at the vehicle lower side relative to the belt line at the time of inflation and deployment. Therefore, a reaction force against an interior finish member that is at the vehicle lower side relative to the belt line may be produced during the inflation and deployment. In the comfortable state, the seat back of the vehicle seat is tilted by at least the predetermined angle in the vehicle side view. The restraint performance improvement portion is provided at a location of the lower end portion of the curtain airbag that corresponds to the vehicle seat in the comfortable state during the inflation and deployment. The restraint performance improvement portion inhibits the head area of a vehicle occupant from slipping past the curtain airbag to the vehicle width direction outer side thereof during restraint of the vehicle occupant. Therefore, when the curtain airbag inflates and deploys, even if the head area of a vehicle occupant is disposed in a vicinity of the lower end portion of the curtain airbag due to the vehicle seat being in the comfortable state, a case of the head area slipping past the curtain airbag to the vehicle width direction outer side thereof may be suppressed. Furthermore, because a reaction force may be produced by the leading end chamber, the head area may be effectively restrained by the curtain airbag.

The meaning of the term "belt line" as used herein is intended to include a line passing through a lower end of a side window of the vehicle; in other words, a line passing through an upper end of a door panel.

In a curtain airbag device for a vehicle according to a second aspect, in the curtain airbag device for a vehicle according to the first aspect, the restraint performance improvement portion is configured such that a friction force of a vehicle width direction inner side face of the curtain airbag is greater than a friction force of the vehicle width direction inner side face at portions of the curtain airbag other than the restraint performance improvement portion.

According to the curtain airbag device for a vehicle according to the second aspect, the friction force of the surface of the vehicle width direction inner side of the curtain airbag at the restraint performance improvement portion is greater than the friction force of the vehicle width direction inner side face at portions of the curtain airbag other than the restraint performance improvement portion. As a result, the head area of a vehicle occupant is less likely to slip against the surface of the curtain airbag when the curtain airbag is in contact with the head area of the vehicle occupant at the time of inflation and deployment. Therefore, the head area of a vehicle occupant may be inhibited from slipping past the curtain airbag to the vehicle width direction outer side thereof even when the head area is disposed in a vicinity of the lower end portion of the curtain airbag during inflation and deployment.

In a curtain airbag device for a vehicle according to a third aspect, in the curtain airbag device for a vehicle according to the second aspect, the restraint performance improvement portion is configured such that a separate base fabric is attached to a face of the curtain airbag at a vehicle cabin interior side thereof, a friction force of the separate base fabric being greater than the friction force of the vehicle width direction inner side face at the portions of the curtain airbag other than the restraint performance improvement portion.

According to the curtain airbag device for a vehicle according to the third aspect, the separate fabric member with a greater friction force than the vehicle width direction inner side face of the portions of the curtain airbag other than the restraint performance improvement portion is attached to the vehicle width direction inner side face of the curtain airbag at the restraint performance improvement portion. Thus, a structure that makes the head area less likely to slip against the surface of the curtain airbag during inflation and deployment may be provided easily. In other words, fabrication is simple.

In a curtain airbag device for a vehicle according to a fourth aspect, in the curtain airbag device for a vehicle according to the second aspect or the third aspect, the restraint performance improvement portion is configured such that a coating is applied to a face of the curtain airbag at a vehicle cabin interior side thereof, the coating providing a greater friction force than the friction force of the vehicle width direction inner side face at the portions of the curtain airbag other than the restraint performance improvement portion.

According to the curtain airbag device for a vehicle according to the fourth aspect, the coating with a greater friction force than the friction force of the portions of the vehicle width direction inner side face of the curtain airbag other than the restraint performance improvement portion is applied to the vehicle width direction inner side face of the curtain airbag at the restraint performance improvement portion. Thus, a structure that makes the head area less likely to slip against the surface of the curtain airbag during inflation and deployment may be provided easily. In other words, fabrication is simple. Moreover, fine adjustment of the region in which the friction force is greater is simple.

In a curtain airbag device for a vehicle according to a fifth aspect, in the curtain airbag device for a vehicle according to any one of the second to fourth aspects, the restraint performance improvement portion comprises stitching at a face of the curtain airbag at a vehicle cabin interior side of the restraint performance improvement portion.

According to the curtain airbag device for a vehicle according to the fifth aspect, because the restraint performance improvement portion comprises the stitching at the vehicle width direction inner side face of the curtain airbag, the friction force of the vehicle width direction inner side face of the curtain airbag at the restraint performance improvement portion is made greater by the stitching than the friction force at other portions of the vehicle width direction inner side face. In addition, because the stitching may be implemented using machine equipment that stitches the curtain airbag itself, an increase in costs may be restrained.

In a curtain airbag device for a vehicle according to a sixth aspect, in the curtain airbag device for a vehicle according to any one of the second to fifth aspects, the restraint performance improvement portion is provided, in addition to the at least a portion of the lower end portion of the curtain airbag that corresponds to the vehicle seat in the comfortable state, at a portion of the leading end chamber of the curtain airbag that, at a time of inflation and deployment, is disposed at the vehicle lower side relative to the belt line and at a vehicle width direction outer side.

According to the curtain airbag device for a vehicle according to the sixth aspect, the restraint performance improvement portion is also provided at the region of the leading end chamber of the curtain airbag that is disposed at the vehicle lower side relative to the belt line during inflation and deployment and is disposed at the vehicle width direction outer side. Therefore, the leading end chamber is less likely to slip against an interior finish member at the vehicle lower side relative to the belt line. Thus, the curtain airbag may more assuredly produce a reaction force from the interior finish member at the time of inflation and deployment.

In a curtain airbag device for a vehicle according to a seventh aspect, in the curtain airbag device for a vehicle according to any one of the first to sixth aspects, an end portion of a strap that is attached to the leading end chamber is attached to a lower end portion of the restraint performance improvement portion.

According to the curtain airbag device for a vehicle according to the seventh aspect, because the end portion of the strap that is connected with the leading end chamber is attached to the lower end portion of the restraint performance improvement portion, the reaction force produced by the leading end chamber may be transmitted to the restraint performance improvement portion via the strap. Therefore, displacement of the curtain airbag restraining the head area of the vehicle occupant to the vehicle width direction outer side may be suppressed, and the head area may be inhibited from slipping past the curtain airbag due to displacement of the curtain airbag. Therefore, the head area of the vehicle occupant may be more effectively restrained.

In a curtain airbag device for a vehicle according to an eighth aspect, in the curtain airbag device for a vehicle according to the seventh aspect, an end portion, at the vehicle front side, of the strap is attached to a strap front end attachment portion that, at a time of inflation and deployment, is disposed at the vehicle lower side of an end portion, at the vehicle rear side, of the leading end chamber; and an end portion, at the vehicle rear side, of the strap is attached to a substantially central portion, in a vehicle front-rear direction, of a region between: a region of the curtain airbag that overlaps with a center pillar garnish in a vehicle side view at a time of inflation and deployment, and the leading end chamber.

According to the curtain airbag device for a vehicle according to the eighth aspect, the end portion, at the vehicle front side, of the strap is attached to the strap front end attachment portion that is disposed at the vehicle lower side of the end portion at the vehicle rear side of the leading end chamber during inflation and deployment. Thus, if the curtain airbag restraining the head area of the vehicle occupant that displaces to the vehicle width direction outer side during a vehicle collision is pushed toward the vehicle width direction outer side and the strap is pulled toward the vehicle width direction outer side, a tension load toward the vehicle rear side and substantially toward the vehicle upper side along an interior finish member acts on the leading end chamber abutting against the interior finish member at the vehicle lower side of the belt line. As a result, depending on the position of the strap front end attachment portion at the leading end chamber, the leading end chamber could be put into an inflected state, known as a "short cut", and the reaction force might not be sufficiently transmitted to the restraint performance improvement portion. However, because the strap front end attachment portion is at the vehicle lower side of the end portion at the vehicle rear side of the leading end chamber, the leading end chamber is unlikely to inflect even when the tension load is applied by the strap. Therefore, the reaction force at the leading end chamber may be effectively transmitted to the restraint performance improvement portion via the strap.

The end portion at the vehicle rear side of the strap is attached to the vehicle front-rear direction substantially central portion of the region between the leading end chamber and the region of the curtain airbag that overlaps with the center pillar garnish in the vehicle side view during inflation and deployment. Therefore, reaction forces may be transmitted via the strap to a region that is less likely to produce a reaction force, between the leading end chamber that produces the reaction force from the interior finish member at the vehicle lower side of the belt line and a region that produces a reaction force from the center pillar garnish. Therefore, displacement of the curtain airbag when restraining the head area of the vehicle occupant may be suppressed, and the head area may be even more effectively restrained.

In a curtain airbag device for a vehicle according to a ninth aspect, in the curtain airbag device for a vehicle according to the seventh aspect or the eighth aspect, an end portion, at the vehicle front side, of the strap is attached to the leading end chamber, in a state in which the leading end chamber of the curtain airbag is folded over toward a vehicle upper side, when the curtain airbag is unfolded into a flat state.

According to the curtain airbag device for a vehicle according to the ninth aspect, the end portion, at the vehicle front side, of the strap is attached to the leading end chamber in the state in which the leading end chamber of the curtain airbag in the unfolded flat state is folded over toward the vehicle upper side. Hence, when the leading end chamber inflates and deploys, the end portion, at the vehicle front side, of the strap displaces to the vehicle lower side. Thus, the strap is pulled toward the vehicle lower side during the inflation and deployment of the curtain airbag, as a result of which there is no slack in the strap. Therefore, the reaction force may be efficiently transmitted through the strap from the leading end chamber to the restraint performance improvement portion.

In a curtain airbag device for a vehicle according to a tenth aspect, in the curtain airbag device for a vehicle according to any one of the first to ninth aspects, one end portion of a tension belt is fixed to a front pillar, and another end portion of the tension belt is attached to a vehicle lower side of an end portion at the vehicle front side of the leading end chamber.

According to the curtain airbag device for a vehicle according to the tenth aspect, the another end portion of the tension belt is attached to the vehicle lower side of the end portion at the vehicle front side of the leading end chamber, and the one end portion of the tension belt is fixed to the front pillar. Therefore, a reaction force may be produced from the front pillar via the tension belt, and greater reaction force may be obtained.

Advantageous Effects of Invention

The curtain airbag device for a vehicle according to the first aspect provides an excellent effect in that restraint performance may be assured even when the head area of a vehicle occupant is disposed in a vicinity of a lower end portion of the curtain airbag at a time of inflation and deployment.

The curtain airbag devices for a vehicle according to the second to fifth aspects provide an excellent effect in that restraint performance for the head area of the vehicle occupant disposed in the vicinity of the lower end portion of the curtain airbag at the time of inflation and deployment may be improved with a simple structure.

The curtain airbag device for a vehicle according to the sixth aspect provides an excellent effect in that restraint performance may be further improved.

The curtain airbag devices for a vehicle according to the seventh to tenth aspects provide an excellent effect in that restraint performance may be even further improved.

BRIEF DESCRIPTION OF THE DRAWINGS

Preferred embodiments will be described in detail based on the following figures, wherein.

DETAILED DESCRIPTION

First Exemplary Embodiment

Figure 1:
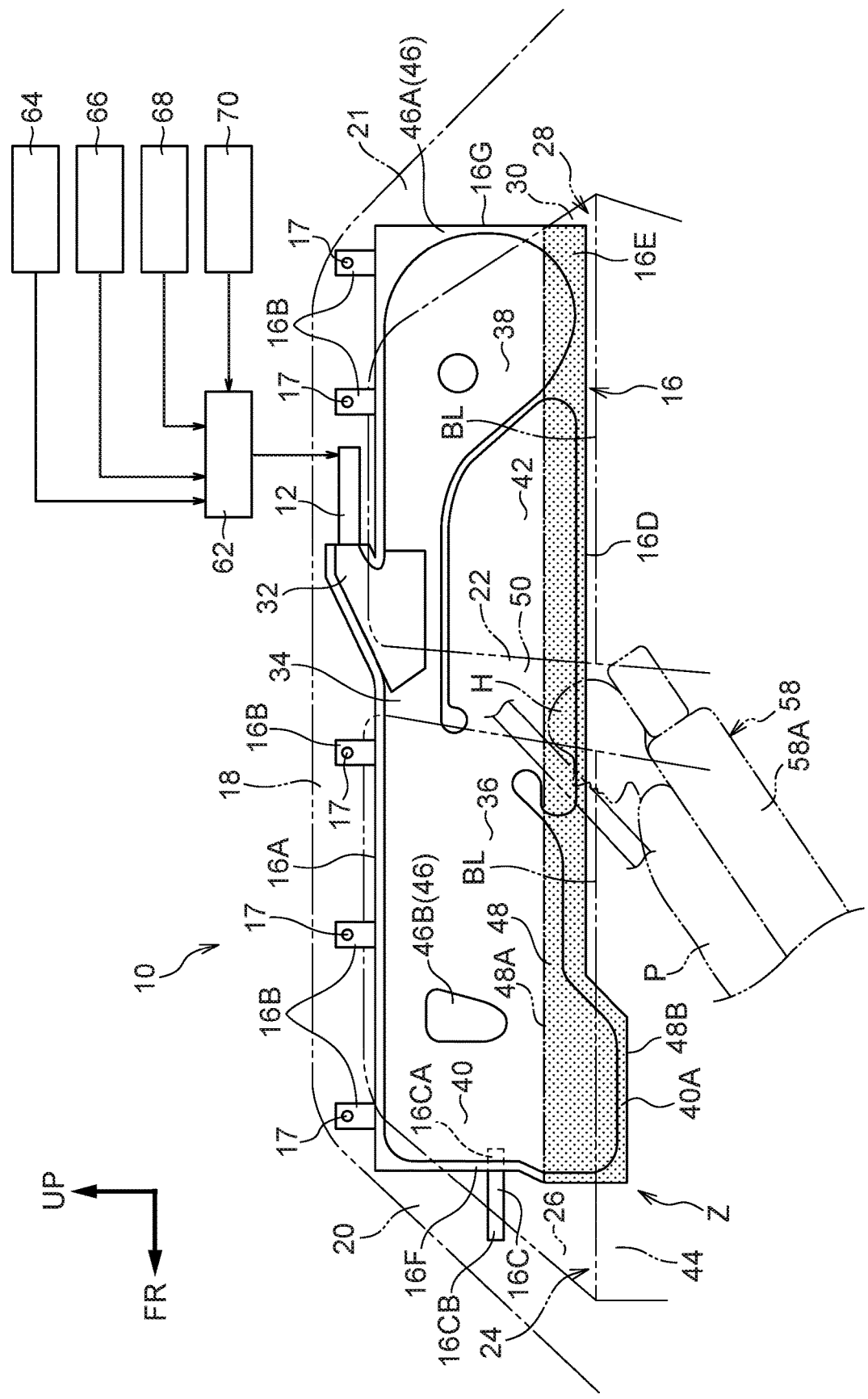
FIG. 1 is a side view showing an inflated and deployed state of a curtain airbag device for a vehicle according to a first exemplary embodiment.
Figure 2:
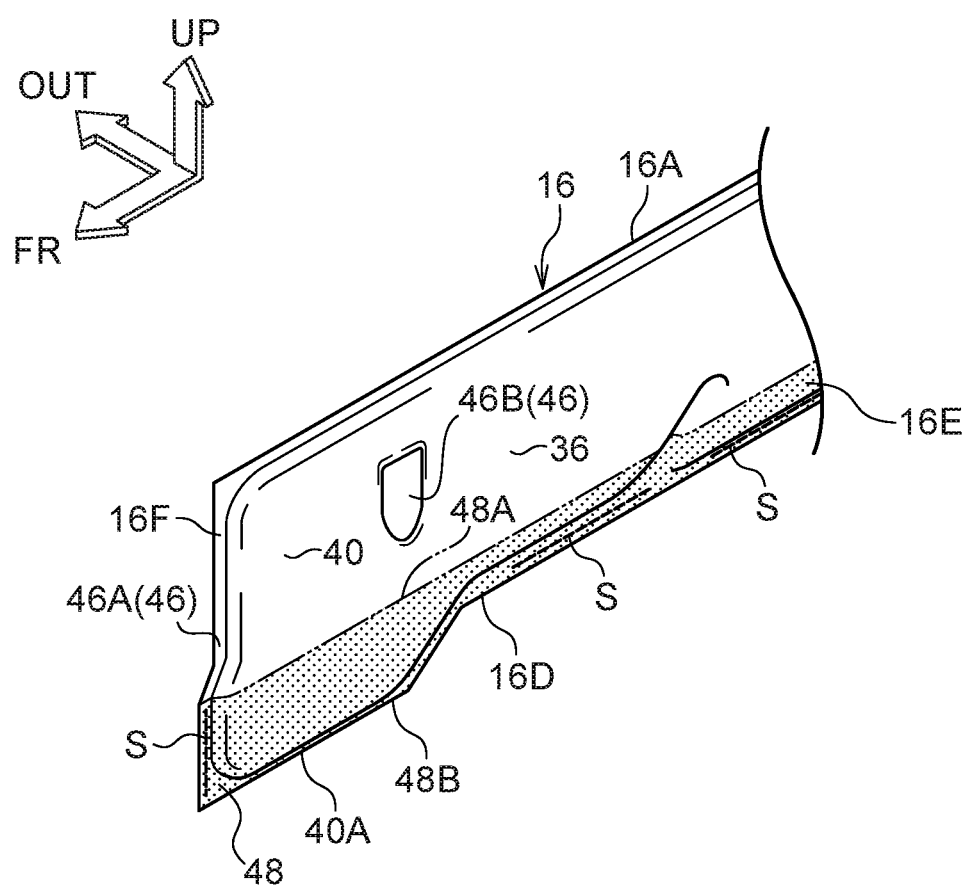
FIG. 2 is a schematic perspective view showing a state in which area Z in FIG. 1 is viewed toward the vehicle rear side from a vehicle cabin interior side.

Herebelow, a first exemplary embodiment of the curtain airbag device for a vehicle relating to the present invention is described using FIG. 1 and FIG. 2. An arrow FR that is shown as appropriate in these drawings indicates a vehicle front side, an arrow UP indicates a vehicle upper side, and an arrow OUT indicates a vehicle width direction outer side.

—Overall Structure—

FIG. 1 shows a side view, seen from a vehicle cabin interior side, of an activated state of a curtain airbag device for a vehicle 10 according to the present exemplary embodiment. As shown in FIG. 1, the curtain airbag device for a vehicle 10 includes an inflator 12 with a substantially cylindrical shape and a curtain airbag 16. The inflator 12 generates gas at a time of vehicle collision. The curtain airbag 16 is connected with the inflator 12, receives a supply of the gas generated by the inflator 12, and inflates and deploys.

In a state before installation of the curtain airbag device for a vehicle 10 in the vehicle, the curtain airbag device for a vehicle 10 is assembled to be a member with a long, narrow, elongated shape by outward roll-folding of the curtain airbag 16. Outward roll-folding refers to a folding mode (see FIG. 6C) in which a roll-folded portion, which is not shown in the drawings, is disposed at the vehicle width direction outer side during the process of deployment of the curtain airbag 16 (i.e., the opposite side of the curtain airbag 16 from the side thereof at which the head area of a vehicle occupant will be disposed). The curtain airbag device for a vehicle 10 in this state is stowed: into a space between a roof side rail 18 and a vehicle width direction outer side end portion of a ceiling, which is not shown in the drawings; into a space between a front pillar 20 and a front pillar garnish, which is not shown in the drawings, disposed at the vehicle cabin interior side of the front pillar 20; and into a space between a rear pillar 21 and a rear pillar garnish, which is not shown in the drawings, disposed at the vehicle cabin interior side of the rear pillar 21.

The inflator 12 is formed in a long, narrow, cylindrical shape and is disposed, for example, at the vehicle upper side of a vicinity of a center pillar 22 with an axial direction of the inflator 12 in the vehicle front-and-rear direction. Plural gas jetting holes, which are not shown in the drawings, are formed in a distal end outer periphery portion of the inflator 12. The interior of the inflator 12 is charged with, for example, a gas generating agent. When the inflator 12 is activated, the gas generating agent ignites and generates a large volume of gas, and the gas is jetted out through the gas jetting holes. The inflator 12 with this structure is fixed to the roof side rail 18 via a bracket, which is not shown in the drawings. A center pillar garnish 50 is provided at the vehicle cabin interior side of the center pillar 22. The center pillar garnish 50 serves as an interior finish member that covers the vehicle cabin interior side of the center pillar 22.

—Curtain Airbag—

The curtain airbag 16 is constituted as a fabric member in a substantially rectangular bag shape that is specified to be large enough, when the curtain airbag 16 inflates and deploys, to substantially cover both a side window 26 of a side door 24 at a front seat and a side window 30 of a side door 28 at a rear seat in a vehicle side view. To describe this more specifically, the curtain airbag 16 is provided with a gas introduction portion 32, a gas supply portion 34, a front main chamber 36, a rear main chamber 38, a front delay chamber 40 and a rear delay chamber 42. The distal end side of the inflator 12 is inserted into the gas introduction portion 32. The gas supply portion 34 extends in a linear shape in the vehicle front-and-rear direction along an upper edge of the curtain airbag 16. The front main chamber 36 corresponds to a protection area for the head area of a vehicle occupant P sitting on a front vehicle seat 58 and inflates and deploys at the vehicle width direction outer side of this head area. The rear main chamber 38 corresponds to a protection area for the head area of a vehicle occupant sitting on a rear vehicle seat that is not shown in the drawings and inflates and deploys at the vehicle width direction outer side of this head area. The front delay chamber 40 is provided adjacent to the front side of the front main chamber 36 in the vehicle front-and-rear direction and serves as a leading end chamber. The rear delay chamber 42 is provided adjacent to the front side of the rear main chamber 38 in the vehicle front-and-rear direction.

A lower edge portion 16D of the curtain airbag 16 is specified such that in the vehicle side view, apart from a region corresponding with the front delay chamber 40, the lower edge portion 16D is disposed at the vehicle lower side relative to the upper end of a head area H of a vehicle occupant P sitting on the front vehicle seat 58 that is in the comfortable state but is disposed at the vehicle upper side relative to a belt line BL. In the comfortable state, a seat back 58A is tilted toward the vehicle rear side by more than a predetermined angle in the vehicle side view. This predetermined angle is an angle formed in the vehicle side view between the seat back 58A and a seat cushion, which is not shown in the drawings, that is a sitting surface of the vehicle seat 58. The predetermined angle is, for example, 48°. An upper end portion (shoulder aperture) of the seat back 58A in the comfortable state is disposed at the vehicle lower side relative to the belt line BL. The head area H of the vehicle occupant P sitting on the front vehicle seat 58 in the comfortable state is disposed at a location overlapping with the belt line BL in the vehicle side view. In the present exemplary embodiment, as an example, a crash test dummy (mannequin) that serves as a model of a vehicle occupant to be protected is seated on the vehicle seat 58 in the comfortable state, and the lower edge portion 16D of the curtain airbag 16 is disposed at the vehicle lower side relative to the head area H of the dummy. The dummy is, for example, a WorldSID (World Side Impact Dummy) AF05 dummy (representing the 5th percentile of American adult females).

The front main chamber 36 inflates and deploys over a coverage area wrapping across the center pillar 22 from a vicinity of a central portion in the vehicle front-and-rear direction of the side window 26 at the front seat side. The front delay chamber 40 is disposed at the front side in the vehicle front-and-rear direction of the front main chamber 36, with a second non-inflating portion 46B, which is described below, therebetween. The front delay chamber 40 is formed so as to inflate in a cylindrical shape with a length direction in the vehicle vertical direction. The front delay chamber 40 is formed such that a lower end portion 40A thereof is disposed at the vehicle lower side relative to the belt line BL in the vehicle side view. That is, during inflation and deployment, the lower end portion 40A of the front delay chamber 40 abuts against a front door trim 44, which is an interior finish member provided at the vehicle lower side of the belt line BL.

As a supplementary description of portions through which the gas is supplied from the curtain airbag 16, the gas introduction portion 32 is formed at a substantially central portion in the vehicle front-and-rear direction of an upper edge portion 16A of the curtain airbag 16. The inflator 12 is connected to the gas introduction portion 32. Thus, the generated gas from the inflator 12 passes through the gas introduction portion 32 and is supplied into the curtain airbag 16. The gas introduction portion 32 is in fluid communication with a central portion in the vehicle front-and-rear direction of the gas supply portion 34.

Plural tabs 16B are integrally formed at a suitable spacing at the upper edge portion 16A of the curtain airbag 16. The plural tabs 16B project to the vehicle upper side from the upper edge portion 16A of the curtain airbag 16. The tabs 16B are fixed (anchored) at the roof side rail 18 by fasteners 17. One end portion 16CA of a tension belt 16C in a strap shape is attached to a front end portion 16F of the curtain airbag 16. Another end portion 16CB of the tension belt 16C is fixed to the front pillar 20 by a fixing bolt, which is not shown in the drawings.

Portions of the curtain airbag 16 other than those described above are non-inflating portions 46 into which the gas does not flow. Inflows of gas into each non-inflating portion 46 are restricted by, for example, a cloth member (base fabric) structuring the curtain airbag 16 at the vehicle width direction inner side being sewn together with a base fabric at the vehicle width direction outer side by an annular sewn portion that is not shown in the drawings. A plural number of the non-inflating portions 46 are formed. For example, a first non-inflating portion 46A is specified at outer periphery portions of the curtain airbag 16, and the second non-inflating portion 46B extends in the vehicle vertical direction between the front main chamber 36 and the front delay chamber 40. In addition, a variety of non-inflating portions 46 are specified at the curtain airbag 16 in order to reduce gas supply amounts and enable a reduction in output power of the inflator 12. The structures of the non-inflating portions 46 of the curtain airbag 16 are, for example, widely known structures recited in JP-A No. 2016-055824 and the like. Therefore, these structures are not described in detail here.

—Restraint Performance Improvement Portion—

A restraint performance improvement portion 48 is provided at a lower end portion 16E of the curtain airbag 16. The restraint performance improvement portion 48 is provided at the vehicle width direction inner side face of the curtain airbag 16, and an upper end portion 48A of the restraint performance improvement portion 48 is specified to be at the vehicle upper side relative to the head area H of the vehicle occupant P in the vehicle side view during inflation and deployment. The upper end portion 48A extends substantially horizontally. A lower end portion 48B of the restraint performance improvement portion 48 is specified so as to be superposed with the lower edge portion 16D of the curtain airbag 16 during inflation and deployment. The restraint performance improvement portion 48 is provided to extend from the front end portion 16F to a rear end portion 16G of the curtain airbag 16. That is, the restraint performance improvement portion 48 is specified to include a region of the lower end portion 16E of the curtain airbag 16 that corresponds with the vehicle seat 58 during inflation and deployment.

The restraint performance improvement portion 48 is formed by a nylon-based base fabric that is a separate body from the base fabric of the curtain airbag 16 being attached to the curtain airbag 16 from the vehicle width direction inner side thereof. The base fabric of the restraint performance improvement portion 48 is constituted such that a friction force of a surface thereof (a face opposing the vehicle cabin) is greater than a friction force of portions of the curtain airbag 16 other than the restraint performance improvement portion 48. For example, the base fabric of the restraint performance improvement portion 48 is attached to the first non-inflating portion 46A of the curtain airbag 16 by sewing at a sewn portion S (see FIG. 2).

The curtain airbag 16 and inflator 12 described above are respectively provided at both width direction sides of the vehicle. That is, the curtain airbag device for a vehicle 10 is equipped with a left and right pair of the curtain airbags 16 and a left and right pair of the inflators 12. The curtain airbag 16 and inflator 12 at the vehicle left side have structures with mirror symmetry with the curtain airbag 16 and inflator 12 at the vehicle right side. Accordingly, descriptions of the former are not given herein.

Activation of the curtain airbag device for a vehicle 10 described above is controlled by a controller 62. For example, a front airbag sensor 64, a small overlap collision prediction sensor 66, a side collision prediction sensor 68 and a rollover prediction sensor 70 are connected to the input side of the controller 62. The front airbag sensor 64 is provided at a front side member or the like, and principally predicts full overlap collisions and offset collisions, including oblique impacts. The small overlap collision prediction sensor 66 is disposed at, for example, a portion of a front bumper reinforcement that is at the vehicle width direction outer side relative to a portion thereof connecting with the front side member (a curved corner portion or the like), and principally predicts small overlap collisions. The side collision prediction sensor 68 is disposed at the center pillar 22 or the like and principally predicts side collisions. The rollover prediction sensor 70 is disposed near a central portion of the vehicle body floor and predicts toppling of the vehicle. The output side of the controller 62 is connected to the inflator 12 of the curtain airbag device for a vehicle 10 and suchlike.

To expand on this, the term "oblique impact" (a moving deformable barrier collision or oblique collision) refers to, for example, a collision from diagonally forward of the vehicle (for example, a collision with a relative collision angle of 15° and an overlap amount in the vehicle width direction of around 35%) as defined by the NHTSA (National Highway Transport Safety Administration). In this exemplary embodiment, the relative speed of an oblique impact is assumed to be, as an example, 90 km/h. The meaning of the term "small overlap collision" includes a frontal collision of an automobile that is, for example, a collision defined by the Insurance Institute for Highway Safety (IIHS) in which an overlap amount of the collision in the vehicle width direction is no more than 25%. For example, an impact against the vehicle width direction outer side relative to the front side member, which is a vehicle body framework member, corresponds to the term "small overlap collision". In this exemplary embodiment, the relative speed of a small overlap collision is assumed to be, as an example, 64 km/h.

Operation and Effects of the First Exemplary Embodiment

Now, operation and effects of the first exemplary embodiment are described.

In the present exemplary embodiment, as shown in FIG. 1, the curtain airbag device for a vehicle 10 includes the curtain airbag 16 and the restraint performance improvement portion 48. At a time of vehicle collision, the inflator 12 activates and the interior of the curtain airbag 16 is supplied with gas, as a result of which the curtain airbag 16 inflates and deploys toward the vehicle lower side from the vehicle width direction outer side end portion of the ceiling. The front delay chamber 40 is provided at the vehicle front side of the curtain airbag 16. The lower end portion 40A of the front delay chamber 40 is disposed at the vehicle lower side relative to the belt line BL during inflation and deployment. Therefore, during the inflation and deployment, a reaction force from the front door trim 44 is produced at the vehicle lower side of the belt line BL. During inflation and deployment in the comfortable state in which the seat back 58A of the vehicle seat 58 is tilted by at least the predetermined angle in the vehicle side view, the restraint performance improvement portion 48 is provided at locations of the lower end portion 16E of the curtain airbag 16 that correspond with the vehicle seat 58 in an operation state. Thus, the restraint performance improvement portion 48 suppresses a case of the head area H of the vehicle occupant P slipping past the curtain airbag 16 to the vehicle width direction outer side thereof. Therefore, even when, because the vehicle seat 58 is in the comfortable state, the head area H of the vehicle occupant P is disposed in a vicinity of the lower end portion 16E of the curtain airbag 16 when the curtain airbag 16 inflates and deploys, the head area may be inhibited from slipping past the curtain airbag 16 to the vehicle width direction outer side thereof. Furthermore, because a reaction force may be produced by the front delay chamber 40, the head area may be effectively restrained by the curtain airbag 16. Thus, restraint performance may be assured even when the head area H of the vehicle occupant P is disposed in a vicinity of the lower end portion 16E of the curtain airbag 16 during inflation and deployment.

Because the friction force of the surface of the restraint performance improvement portion 48 at the vehicle width direction inner side of the curtain airbag 16 is greater than the friction force of the vehicle width direction inner side face of the curtain airbag 16 at portions other than the restraint performance improvement portion 48, the head area H of the vehicle occupant P is less likely to slip against the surface of the curtain airbag 16 when the curtain airbag 16 is in contact with the head area H during the inflation and deployment. Therefore, the head area H of the vehicle occupant P may be inhibited from slipping past the curtain airbag 16 to the vehicle width direction outer side thereof even when the head area H is disposed in a vicinity of the lower end portion 16E of the curtain airbag 16 during inflation and deployment.

At the restraint performance improvement portion 48, the separate base fabric with the greater force friction than the friction force of portions of the vehicle width direction inner side face of the curtain airbag 16 other than the restraint performance improvement portion 48 is attached to the vehicle width direction inner side face of the curtain airbag 16. Thus, a structure that makes the head area H less likely to slip against the surface of the curtain airbag 16 during inflation and deployment may be provided easily. In other words, fabrication is simple. Therefore, restraint performance for the head area H of the vehicle occupant P that is disposed in the vicinity of the lower end portion 16E of the curtain airbag 16 during inflation and deployment may be improved with a simple structure.

The base fabric that increases the friction force at the surface of the restraint performance improvement portion 48 is provided only at the lower end portion 16E of the curtain airbag 16. Therefore, in contrast to a structure in which the friction force of the whole surface of the curtain airbag 16 is increased, inflation and deployment of the curtain airbag 16 is not impeded.

In the case of a structure in which the friction force of the whole surface of the curtain airbag 16 is increased, a load that a vehicle occupant would be subjected to when the curtain airbag 16 inflates and deploys in a state in which the vehicle occupant is disposed out of position (OOP) may be increased. In the present exemplary embodiment, by contrast, because the base fabric that increases the friction force of the surface of the restraint performance improvement portion 48 is provided only at the lower end portion 16E of the curtain airbag 16, a load that a vehicle occupant disposed out of position is subjected to during inflation and deployment may be reduced. Thus, what is known as "OOP performance" may be improved.

Figure 3:
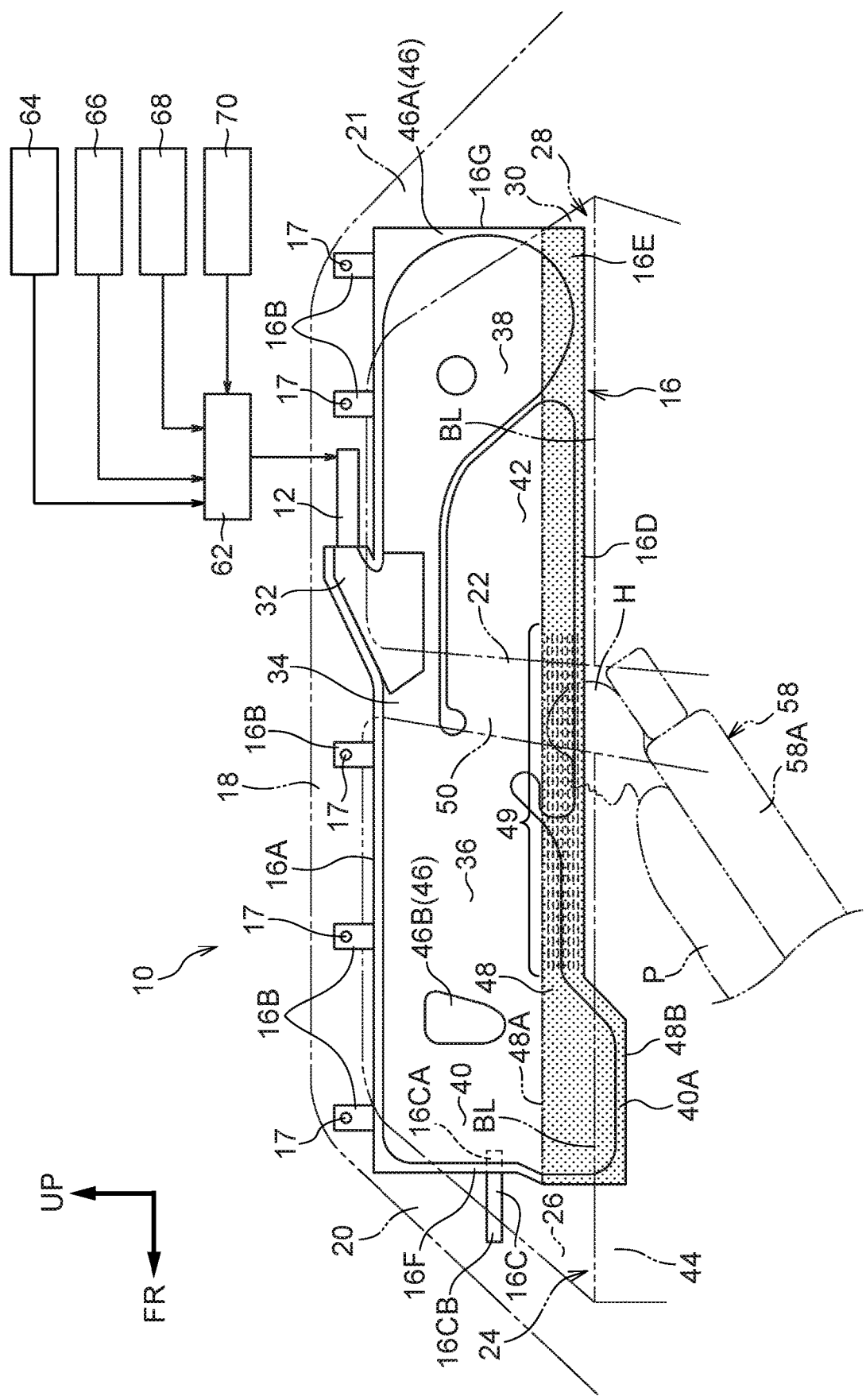
FIG. 3 is a side view showing an inflated and deployed state of a curtain airbag device for a vehicle according to a variant example of FIG. 1.

In the exemplary embodiment described above, the restraint performance improvement portion 48 is formed by the separate base fabric with the greater surface friction force being attached to the vehicle width direction inner side face of the curtain airbag 16, but this is not limiting. As illustrated by the variant example in FIG. 3, a structure is possible in which stitching 49 is implemented at the vehicle width direction inner side face of the curtain airbag 16. More specifically, the stitching 49 is plurally provided at a nylon-based base fabric that is a separate body from the base fabric of the curtain airbag 16, and the base fabric at which the stitching 49 is provided is attached to the vehicle width direction inner side face of the curtain airbag 16. Thus, the friction force of the vehicle width direction inner side face of the curtain airbag 16 may be increased by the stitching 49. In addition, because the stitching 49 may be implemented using machine equipment that stitches the curtain airbag 16 itself, an increase in costs may be restrained.

Second Exemplary Embodiment

Figure 4:
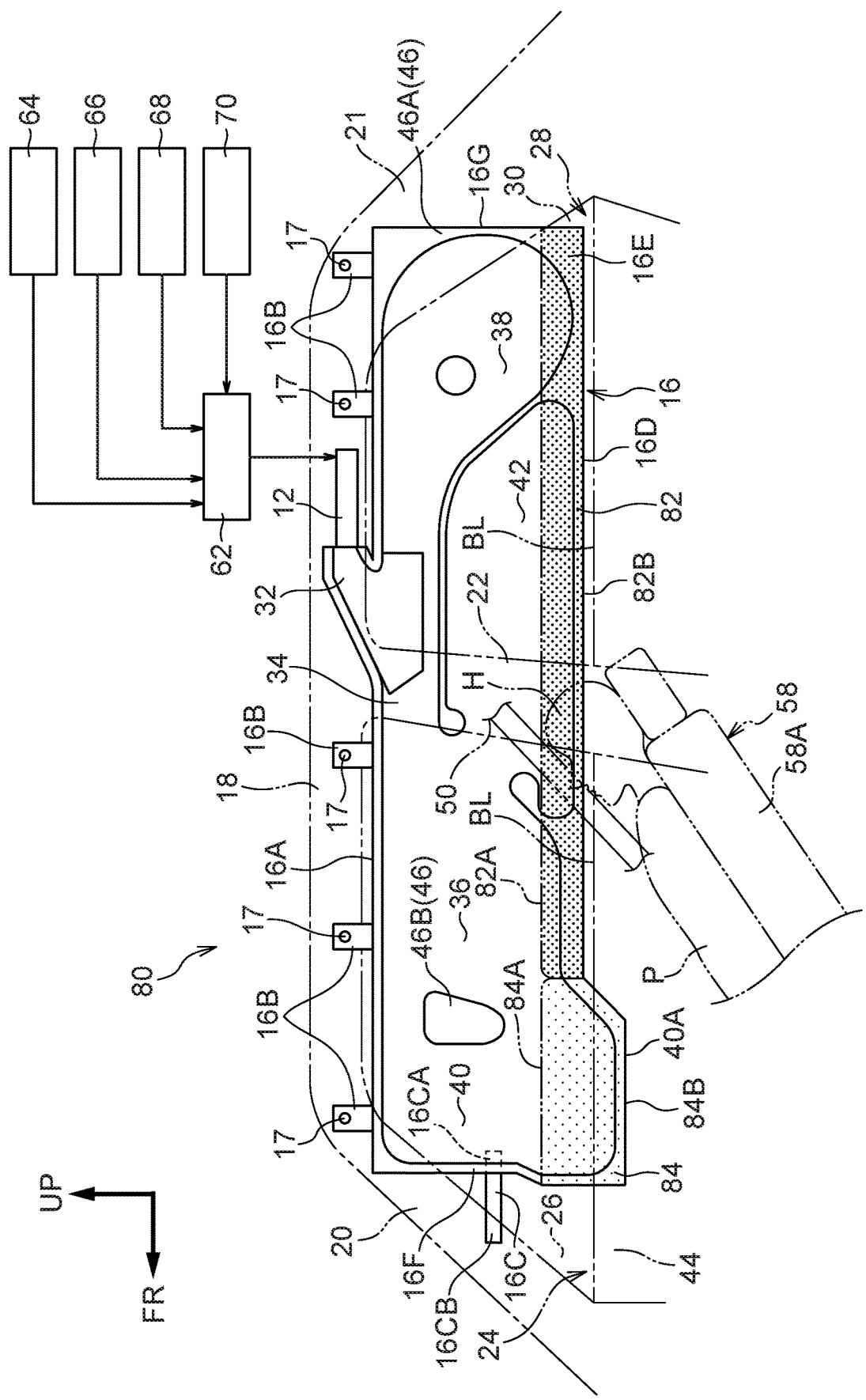
FIG. 4 is a side view showing an inflated and deployed state of a curtain airbag device for a vehicle according to a second exemplary embodiment.

Here, a curtain airbag device for a vehicle according to a second exemplary embodiment of the present invention is described using FIG. 4. Structural portions that are the same as in the first exemplary embodiment described above are assigned the same reference numerals, and descriptions thereof are not given.

A curtain airbag device for a vehicle 80 according to the second exemplary embodiment is basically similar to the first exemplary embodiment but differs in that a restraint performance improvement portion 82 is provided at the vehicle width direction inner side face of the curtain airbag 16 and a restraint performance improvement portion 84 is provided at a vehicle width direction outer side face of the curtain airbag 16.

As shown in FIG. 4, the restraint performance improvement portions 82 and 84 are provided at the lower end portion 16E of the curtain airbag 16. The restraint performance improvement portion 82 is provided at the vehicle width direction inner side face of the curtain airbag 16. An upper end portion 82A of the restraint performance improvement portion 82 is specified to be at the vehicle upper side relative to the head area H of a vehicle occupant P in the vehicle side view. The upper end portion 82A extends substantially horizontally. A lower end portion 82B of the restraint performance improvement portion 82 is specified so as to be superposed with the lower edge portion 16D of the curtain airbag 16 during inflation and deployment.

The restraint performance improvement portion 84 is provided at the vehicle width direction outer side face of the front delay chamber 40 of the curtain airbag 16 during inflation and deployment. Similarly to the restraint performance improvement portion 82, an upper end portion 84A of the restraint performance improvement portion 84 is specified to be at the vehicle upper side relative to the head area H of the vehicle occupant P in the vehicle side view. The upper end portion 84A extends substantially horizontally. A lower end portion 84B of the restraint performance improvement portion 84 is specified so as to be superposed with the lower edge portion 16D of the curtain airbag 16 during inflation and deployment.

The restraint performance improvement portion 84 is provided to extend from the front end portion 16F of the curtain airbag 16 to a vicinity of a boundary between the front delay chamber 40 and the front main chamber 36 during the inflation and deployment. That is, the restraint performance improvement portion 84 is structured to abut against the front door trim 44 at the vehicle lower side of the belt line BL.

The restraint performance improvement portion 82 is provided to extend from a rear end portion of the restraint performance improvement portion 84 of the curtain airbag 16 during inflation and deployment to the rear end portion 16G of the curtain airbag 16. That is, the restraint performance improvement portion 82 is specified to include the region of the lower end portion 16E of the curtain airbag 16 that corresponds with the vehicle seat 58 during inflation and deployment.

The restraint performance improvement portions 82 and 84 are formed by surfaces of the base fabric of the curtain airbag 16 being coated with a coating that provides the greater friction force to the respective surfaces (faces opposing the vehicle cabin) than the friction force of portions of the curtain airbag 16 other than the restraint performance improvement portions 82 and 84. In the present exemplary embodiment, for example, a coating of silicone rubber is applied, and the friction force of the surfaces is increased by making the thickness of the silicone rubber thicker than the thickness of the silicone rubber in the other portions.

Operation and Effects of the Second Exemplary Embodiment

Here, operation and effects of the second exemplary embodiment are described.

The structure described above is similar to the structure of the curtain airbag device for a vehicle 10 according to the first exemplary embodiment except in that the restraint performance improvement portion 82 is provided at the vehicle width direction inner side face of the curtain airbag 16 and the restraint performance improvement portion 84 is provided at the vehicle width direction outer side face of the curtain airbag 16. Therefore, similar effects to the first exemplary embodiment are provided. In addition, at the restraint performance improvement portion 82, a coating that provides the greater friction force than at portions of the vehicle width direction inner side face of the curtain airbag 16 other than the restraint performance improvement portion 82 is applied to the vehicle width direction inner side face of the curtain airbag 16. Thus, a structure that makes the head area H less likely to slip against the surface of the curtain airbag 16 during inflation and deployment may be provided easily. In other words, fabrication is simple. Moreover, fine adjustment of the region in which the friction force is greater is simple. Therefore, restraint performance for the head area H of the vehicle occupant that is disposed in a vicinity of the lower end portion 16E of the curtain airbag 16 during inflation and deployment may be improved with a simple structure.

The restraint performance improvement portion 84 is provided in a region at the vehicle width direction outer side of the front delay chamber 40 of the curtain airbag 16 that is at the vehicle lower side relative to the belt line BL during inflation and deployment. Therefore, the front delay chamber 40 is less likely to slip against the front door trim 44 that is at the vehicle lower side of the belt line BL, and the curtain airbag 16 may more assuredly provide a reaction force from the front door trim 44 during the inflation and deployment. Thus, restraint performance may be further improved.

In the present exemplary embodiment, the restraint performance improvement portions 82 and 84 are formed by a coating with the greater surface friction force being applied to the respective surfaces of the base fabric of the curtain airbag 16, but this is not limiting. A top coat that reduces the surface friction force may be applied to portions of the curtain airbag 16 other than the restraint performance improvement portions 82 and 84, making the surface friction force of the restraint performance improvement portions 82 and 84 larger in relative terms.

Third Exemplary Embodiment

Here, a curtain airbag device for a vehicle 90 according to a third exemplary embodiment of the present invention is described using FIG. 5, FIG. 6A, FIG. 6B and FIG. 6C. Structural portions that are the same as in the first exemplary embodiment described above are assigned the same reference numerals, and descriptions thereof are not given.

The curtain airbag device for a vehicle 90 according to the third exemplary embodiment is basically similar to the first exemplary embodiment but differs in that a restraint performance improvement portion 92 includes a strap 94 that is attached to the front delay chamber 40.

Figure 5:
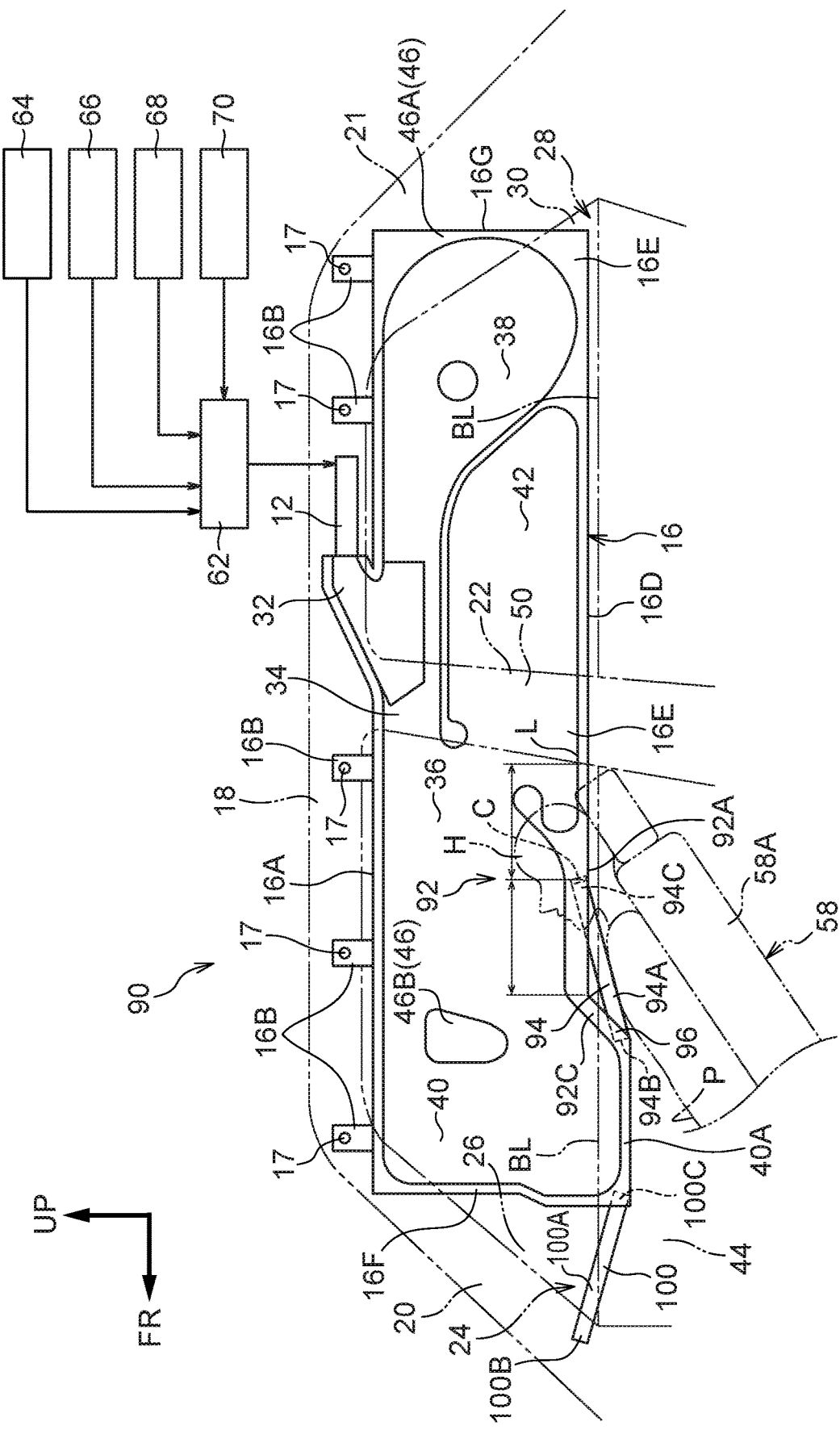
FIG. 5 is a side view showing an inflated and deployed state of a curtain airbag device for a vehicle according to a third exemplary embodiment.

That is, as shown in FIG. 5, the restraint performance improvement portion 92 is provided at the lower end portion 16E of the curtain airbag 16. The strap 94 is attached to a lower end portion 92A of the restraint performance improvement portion 92. The strap 94 is formed by, for example, a strap main body portion 94A being plurally superposed in the vehicle width direction. The strap main body portion 94A is formed in a substantially rectangular shape with a length direction substantially in the vehicle front-and-rear direction and is formed of substantially the same material as the base fabric of the curtain airbag 16.

An end portion 94B at the vehicle front side of the strap 94 is attached by sewing or the like to a strap front end attachment portion 96 that is provided at the vehicle lower side of an end portion 92C at the vehicle rear side of the front delay chamber 40. An end portion 94C at the vehicle rear side of the strap 94 is attached by sewing or the like to a vehicle front-and-rear direction substantially central portion C of a region between a region L of the curtain airbag 16 that overlaps with the center pillar garnish 50 and the front delay chamber 40.

Figure 6A:
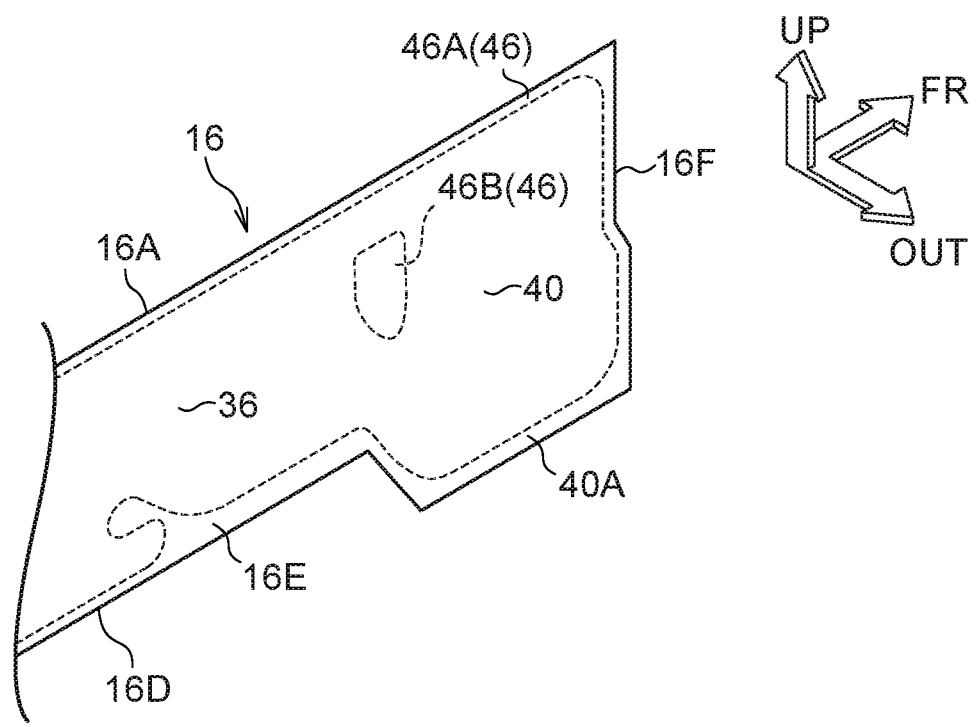
FIG. 6A is a schematic perspective view showing an unfolded flat state of a curtain airbag of the curtain airbag device for a vehicle according to the third exemplary embodiment.
Figure 6B:
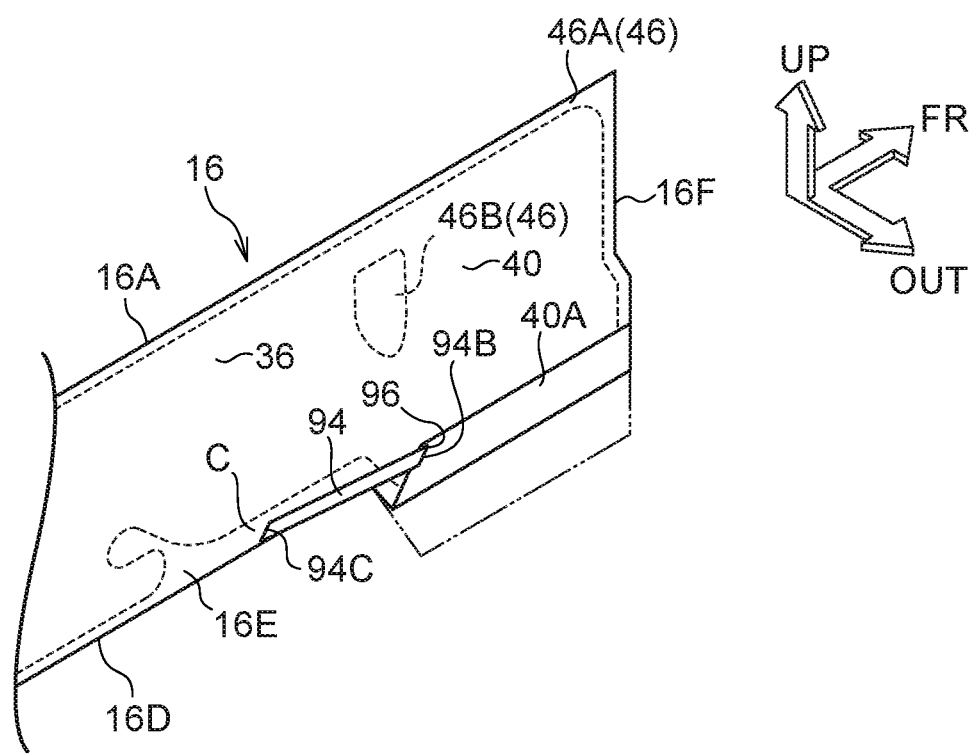
FIG. 6B is a schematic perspective view, corresponding to FIG. 6A, showing a state in which a leading end chamber is folded over toward the vehicle upper side.

The strap 94 is attached to the curtain airbag 16 in a state in which, when unfolded flat, the front delay chamber 40 of the curtain airbag 16 is folded over. That is, when the curtain airbag 16 is being installed in the vehicle, from an unfolded flat state of the curtain airbag 16 (a state in which the curtain airbag 16 is spread out flat) as shown in FIG. 6A, the lower end portion 40A of the front delay chamber 40 is folded over toward the vehicle upper side as shown in FIG. 6B.

In the state in which the lower end portion 40A of the front delay chamber 40 has been folded over to the vehicle upper side, the end portion 94B at the vehicle front side of the strap 94 is attached to the strap front end attachment portion 96. Also in this state, the end portion 94C at the vehicle rear side of the strap 94 is attached to the vehicle front-and-rear direction substantially central portion C of the curtain airbag 16. Hence, when gas is supplied into the front delay chamber 40 at a time of inflation and deployment and the front delay chamber 40 inflates and deploys toward the vehicle lower side while being released from the folded state, the end portion 94B at the vehicle front side of the strap 94 moves toward the vehicle lower side. As a result, tension acts on the strap 94 and the strap 94 is in a state without slackness (see FIG. 5).

Figure 6C:
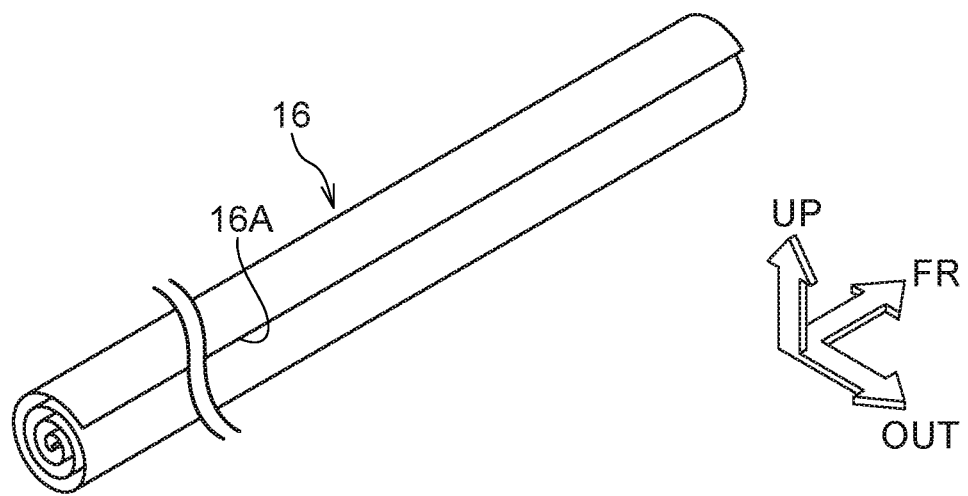
FIG. 6C is a schematic perspective view, corresponding to FIG. 6B, showing a state in which the whole of the curtain airbag is folded up.

As shown in FIG. 6C, the curtain airbag 16 to which the strap 94 is attached is assembled to be a member with a long, narrow, elongated shape by outward roll-folding and is installed in the vehicle.

As shown in FIG. 5, a tension belt 100 in a strap shape is attached by sewing or the like to the front end portion 16F of the curtain airbag 16. The tension belt 100 is formed by, for example, a belt main body portion 100A being plurally superposed in the vehicle width direction. The belt main body portion 100A is formed in a substantially rectangular shape with a length direction substantially in the vehicle front-and-rear direction and is formed of substantially the same material as the base fabric of the curtain airbag 16.

One length direction end portion of the tension belt 100, which is to say a front end portion 100B at the vehicle front side, is fixed to the front pillar 20 by a fixing bolt, which is not shown in the drawings. The other length direction end portion of the tension belt 100, which is to say a rear end portion 100C at the vehicle rear side, is attached by sewing or the like to the vehicle lower side of the front end portion 16F at the vehicle front side of the front delay chamber 40.

Operation and Effects of the Third Exemplary Embodiment

Here, operation and effects of the third exemplary embodiment are described.

The structure described above is similar to the structure of the curtain airbag device for a vehicle 10 according to the first exemplary embodiment, except in that the restraint performance improvement portion 92 includes the strap 94 that is attached to the front delay chamber 40. Therefore, similar effects to the first exemplary embodiment are provided. In addition, because the strap 94 that is connected with the front delay chamber 40 is attached to the lower end portion 92A of the restraint performance improvement portion 92, a reaction force that the front delay chamber 40 produces may be transmitted through the strap 94 to the restraint performance improvement portion 92. As a result, displacement of the curtain airbag 16 that restrains the head area H of a vehicle occupant P to the vehicle width direction outer side may be suppressed, and the head area may be inhibited from slipping past the curtain airbag 16 due to displacement of the curtain airbag 16. Therefore, the head area H of the vehicle occupant P may be more effectively restrained. Thus, restraint performance may be even further improved.

The end portion 94B at the vehicle front side of the strap 94 is attached to the strap front end attachment portion 96 that is disposed at the vehicle lower side of the end portion 94B at the vehicle rear side of the front delay chamber 40 during inflation and deployment. Thus, if the curtain airbag 16 restraining the head area H of the vehicle occupant P that displaces to the vehicle width direction outer side during a vehicle collision is pushed toward the vehicle width direction outer side and the strap 94 is pulled toward the vehicle width direction outer side, a tension load toward the vehicle rear side and substantially toward the vehicle upper side along the front door trim 44 acts on the front delay chamber 40 abutting against the front door trim 44 at the vehicle lower side of the belt line BL. As a result, depending on the position of the strap front end attachment portion 96 at the front delay chamber 40, the front delay chamber 40 could be put into an inflected state, known as a "short cut", and the reaction force might not be sufficiently transmitted to the restraint performance improvement portion 92. However, because the strap front end attachment portion 96 is at the vehicle lower side of the end portion 94B at the vehicle rear side of the front delay chamber 40, the front delay chamber 40 is unlikely to inflect even when the tension load is applied by the strap 94. Therefore, the reaction force of the front delay chamber 40 may be efficiently transmitted to the restraint performance improvement portion 48 via the strap 94.

The end portion 94C at the vehicle rear side of the strap 94 is attached to the vehicle front-and-rear direction substantially central portion C of the region between the region L of the curtain airbag 16 that overlaps with the center pillar garnish 50 in the vehicle side view during inflation and deployment and the front delay chamber 40. Therefore, a reaction force may be transmitted via the strap 94 to a region that is unlikely to produce a reaction force, which is between the front delay chamber 40 that produces the reaction force from the front door trim 44 at the vehicle lower side of the belt line BL and a region that produces a reaction force from the center pillar garnish 50. Therefore, displacement of the curtain airbag 16 when restraining the head area H of the vehicle occupant P is suppressed, and the head area H may be even more effectively restrained.

As shown in FIG. 6B, the end portion 94B at the vehicle front side of the strap 94 is attached to the front delay chamber 40 of the curtain airbag 16 when unfolded flat in the state in which the front delay chamber 40 is folded over to the vehicle upper side. Hence, when the front delay chamber 40 inflates and deploys, the end portion 94B at the vehicle front side of the strap 94 is displaced toward the vehicle lower side. That is, because the strap 94 is pulled toward the vehicle lower side during the inflation and deployment of the curtain airbag 16, there is no slack in the strap 94. As a result, a reaction force may be efficiently transmitted from the front delay chamber 40 to the restraint performance improvement portion 92 via the strap 94.

The rear end portion 100C of the tension belt 100 is attached to the vehicle lower side of the front end portion 16F of the front delay chamber 40 (the curtain airbag 16), and the front end portion 100B of the tension belt 100 is fixed to the front pillar 20. Therefore, the front delay chamber 40 may produce a reaction force from the front pillar 20 via the tension belt 100, and greater reaction force may be obtained. Thus, restraint performance may be even further improved.

In the third exemplary embodiment described above, the end portion 94B at the vehicle front side of the strap 94 is attached to the strap front end attachment portion 96 in the state in which the lower end portion 40A of the front delay chamber 40 of the curtain airbag 16 in the unfolded flat state is folded over to the vehicle upper side, but this is not limiting. The end portion 94B at the vehicle front side of the strap 94 may be attached to the strap front end attachment portion 96 in a state in which the front delay chamber 40 is not folded over.

The restraint performance improvement portion 92 includes the strap 94 that is attached to the front delay chamber 40, but this is not limiting. A base fabric with the greater surface friction force at the vehicle cabin interior side thereof may be attached to the vehicle width direction inner side face of the curtain airbag 16, or a coating that increases the friction force at the vehicle cabin interior side of the curtain airbag 16 may be applied. Further, the stitching 49 may be provided at the vehicle cabin interior side of the curtain airbag 16. A structure is possible in which the restraint performance improvement portion 84 is provided at the vehicle width direction outer side face of the front delay chamber 40 of the curtain airbag 16 during inflation and deployment, making the front delay chamber 40 less likely to slip against the front door trim 44.

Hereabove, exemplary embodiments of the present invention have been described. The present invention is not limited by these descriptions, and it will be clear that numerous modifications outside of these descriptions may be embodied within a technical scope not departing from the gist of the invention.

What is claimed is:

1. A curtain airbag device for a vehicle, the curtain airbag device comprising:
   a curtain airbag configured to inflate and deploy toward a vehicle lower side from an outer side end portion of a ceiling of the vehicle in a vehicle width direction, when an inflator activates at a time of vehicle collision and supplies gas into the curtain airbag, the curtain airbag including a leading end chamber provided at a vehicle front side of the curtain airbag, a lower end portion of the leading end chamber being disposed at a vehicle lower side relative to a belt line at a time of inflation and deployment of the curtain airbag; and
   a restraint performance improvement portion provided at a portion of a lower end portion of the curtain airbag that corresponds to a vehicle seat in a comfortable state in which a seat back of the vehicle seat is tilted toward a vehicle rear side by at least a predetermined angle in a vehicle side view, the curtain airbag producing a reaction force at the time of inflation and deployment from a region at which the leading end chamber is disposed at the vehicle lower side relative to the belt line, and the restraint performance improvement portion configured to prevent a head area of a vehicle occupant from moving past the curtain airbag toward an outer side of the curtain airbag in the vehicle width direction during restraint of the vehicle occupant, wherein:
   a first end portion of a strap that is attached to the leading end chamber is attached to a lower end portion of the restraint performance improvement portion, the first end portion, at the vehicle rear side, of the strap is attached to a central portion, in a vehicle front-rear direction, of a region between (i) a region of the curtain airbag that overlaps with a center pillar garnish in a vehicle side view at the time of inflation and deployment, and (ii) the leading end chamber; and
   a second end portion, at the vehicle front side, of the strap is attached to a strap front end attachment portion that, at the time of inflation and deployment, is disposed at the vehicle lower side of an end portion, at the vehicle rear side, of the leading end chamber.

2. The curtain airbag device for the vehicle according to claim 1, wherein the restraint performance improvement portion is configured as a separate base fabric attached to a face of the curtain airbag at a vehicle cabin interior side of the curtain airbag, and a friction force of the separate base fabric is greater than the friction force of the inner side face in the vehicle width direction at the portions of the curtain airbag other than the restraint performance improvement portion.

3. The curtain airbag device for the vehicle according to claim 1, wherein the restraint performance improvement portion is configured as a coating applied to a face of the curtain airbag at a vehicle cabin interior side of the curtain airbag, the coating providing a greater friction force than the friction force of the inner side face in the vehicle width direction at the portions of the curtain airbag other than the restraint performance improvement portion.

4. The curtain airbag device for the vehicle according to claim 1, wherein the restraint performance improvement portion includes stitching at a face of the curtain airbag at a vehicle cabin interior side of the restraint performance improvement portion.

5. The curtain airbag device for the vehicle according to claim 1, wherein the second end portion, at the vehicle front side, of the strap is attached to the leading end chamber in a state in which the leading end chamber of the curtain airbag is folded over toward a vehicle upper side, when the curtain airbag is unfolded into a flat state.

6. The curtain airbag device for the vehicle according to claim 1, wherein:
   a first end portion of a tension belt is fixed to a front pillar; and
   a second end portion of the tension belt is attached to a vehicle lower side of an end portion, at a vehicle front side, of the leading end chamber.

* * * * *